United States Patent [19]

Di Cio et al.

[11] 3,917,655

[45] Nov. 4, 1975

[54] OXIDATION OF BENZENE TO MALEIC ANHYDRIDE USING A NEW CATALYST

[75] Inventors: Alessandro Di Cio, Bergamo; Angelo Vitali, Scanzorosciate, both of Italy

[73] Assignee: Prolizenz AG, Chur, Switzerland

[22] Filed: Nov. 30, 1972

[21] Appl. No.: 310,691

Related U.S. Application Data

[63] Continuation of Ser. No. 83,201, Oct. 22, 1970, abandoned.

[30] Foreign Application Priority Data

Oct. 22, 1969 Switzerland...................... 15793/69

[52] U.S. Cl. .............. 260/346.8; 252/435; 252/437
[51] Int. Cl.²......................................... C07D 307/60
[58] Field of Search ...... 260/346.8 A; 252/435, 437

[56] References Cited
UNITED STATES PATENTS
3,044,966 7/1962 Callahan et al..................... 252/437

FOREIGN PATENTS OR APPLICATIONS
19,108 9/1963 Japan............................... 260/346.8

*Primary Examiner*—Henry R. Jiles
*Assistant Examiner*—Bernard I. Dentz
*Attorney, Agent, or Firm*—Ernest F. Marmorek

[57] ABSTRACT

A catalyst for use in connection with oxidation reactions carried out in the gaseous phase with oxygen containing gases and a method of preparing said catalyst. The catalyst includes molybdenum, vanadium and phosphorous containing metal oxides in stoichiometric parts by weight. A porous carrier is impregnated with a solution containing the constituents of said catalyst; the carrier is subsequently dried and thereafter calcined.

9 Claims, No Drawings

OXIDATION OF BENZENE TO MALEIC ANHYDRIDE USING A NEW CATALYST

This is a continuation, of application Ser. No. 83,201, filed Oct. 22, 1970 and now abandoned.

BACKGROUND OF THE INVENTION

The invention relates to a catalyst for gaseous phase oxidation reactions by means of oxygen containing gases. The composition of the catalyst is based on molybdenum and vanadium compounds. The invention also relates to a method of producing the catalyst and to the utilization thereof in the preparation of maleic acid anhydride by the oxidation of benzene (benzol) with oxygen containing gases in the presence of said catalyst.

Catalysts for oxidation reactions are known, especially for the preparation of maleic acid anhydride by the oxidation of benzene (benzol) with atmospheric oxygen, using catalysts containing vanadium oxide and molybdenum oxide. Phosphorous containing compounds, as well as smaller quantities of metallic oxides or metals, may be added to the oxides of vanadium and molybdenum whereby complex catalytic mixtures are formed which considerably differ from one another with respect to effectiveness and selectivity. The behavior of these mixtures is generally not foreseeable since unpredictability and an extreme degree of specifity are common to all catalytic phenomena.

Moreover, the effectiveness and selectivity of the catalysts are closely connected with their composition, structure, mode of preparation, and distribution on the carrying medium, though not in a foreseeable manner. These known catalysts, however, have not as yet proven themselves satisfactorily in actual practice.

SUMMARY OF THE INVENTION

One of the principal objects of the present invention is in the preparation and method of use of a catalyst for gaseous phase oxidation reactions by means of oxygen containing gases.

It is another object of the present invention to avoid the drawbacks of the prior art.

It is another object of the present invention to provide a catalyst which is relatively inexpensive to make and use.

It is still another object of the present invention to produce a catalyst which may be used in conjunction with existing laboratory equipment.

Broadly speaking, it has been found, that in accordance with the present invention catalysts having improved activity and stability can be obtained, if they contain certain quantities of bismuth.

In accordance with the present invention, the catalyst used for gaseous phase oxidation reactions by means of oxygen containing gases which had been obtained through impregnation of a porous carrier with a solution of the catalyzing constituents and had been subjected to subsequent calcination processes and furthermore contains molybdenum — as well as vanadium — compounds, are characterized by the following oxides, the content being stoichiometrically expressed as parts per weight of said oxides: 1 part $MoO_3$, 1.2 – 2.5 parts of $V_2O_5$, 0.2 – 1.1 parts $Bi_2O_3$, 0.02 – 0.05 parts $P_2O_5$, 0.03 – 0.06 parts $Na_2O$ and 0.03 – 0.30 parts $SiO_2$.

As is customary, the composition of the catalyst is given by the oxide content, however, only the stoichiometric composition is given without reference to the structural linkage of the elements. It is to be assumed that they do not consist of a mixture of oxides. Most elements, which are instrumental in forming the ultimate compound, are combined in such a manner that they form more or less complex salts. The accurate identification of these salts is very difficult and cannot be carried out with 100% accuracy; this, however, it not a prerequisite to a full understanding of the present invention.

Alumina is preferably used as the carrier for the catalyst. It consists mainly of aluminum oxide and as is customary for utilization with catalysts contains smaller quantities of the oxide of alkali metals, alkaline earth metals and in certain cases other metallic oxides. Soluble iron, due to its detrimental effect in oxidation reactions, should not, if possible, be present in the carrier.

Further objects and advantages of the invention will be set forth in part in the following specification and in part will be obvious therefrom without being specifically referred to, the same being realized and attained as pointed out in the claims hereof.

The following examples, which are not to be considered as limiting, illustrate details of the production of the aforementioned catalysts.

DESCRIPTION OF THE PREFERRED EMBODIMENTS

The following are examples of the composition of a suitable carrier:

| | |
|---|---|
| $Al_2O_3$ | 87.02% |
| $SiO_2$ | 9.63% |
| $TiO_2$ | 0.85% |
| CaO | 1.38% |
| $Fe_2O_3$ | 0.52% |
| MgO | 0.12% |
| $Na_2O$ | 0.21% |
| $K_2O$ | 0.27% |

The surface of the supports in a preferred embodiment should range between 100 and 1,000 cm²/g, and preferably lie between 400 and 500 cm²/g.

The method of preparing the catalyst is accomplished by using a porous carrier impregnated with a solution of catalyst containing components; subsequently drying between about 7 to about 8 hours at a temperature below about 100° C. The mass is then subjected to calcination for about 3 to 7 hours at a temperature above about 400° C. The latter process is preferably carried out in a closed area, which permits only the escape of split off gases.

The foregoing may be exemplified by the following: into a vessel of acid-resistant material, for instance, one of polyvinyl chloride, there is placed a mixture of 35.90 parts hydrochloric acid (33% conc.) and 2.55 parts of ammonium-molybdate-tetrahydrate. (All proportions given in this specification are given as parts per weight.)

After the mixture has been stirred for a few minutes, 4.02 parts of ammonium-meta-vanadate is added and the stirring is continued for several minutes more.

In two suitable containers, for instance containers consisting of polyvinyl chloride, two additional solutions are separately prepared, namely one solution having 0.45 parts of tri-sodiumphosphate-dodecahydrate in 3.59 parts of water, and a second solution having 3.77 parts bismuth-nitrate-pentahydrate and 0.36 parts conc. nitric acid in 4.48 parts of water. These solutions, together with 0.18 parts of finely ground silicon dioxide, preferably about 200 mesh, are added to the first solution containing the hydrochloric acid. The entire mixture is occasionally stirred, up to the time that it is to be used.

As a carrier material, small alumina tubes, made by extrusion and measuring 4 × 4 mm, can be used. They should preferably have the above-mentioned chemical composition and have a surface of 400 cm² per gram. The carrier is first screened through a 6-mesh screen (ASTM-Standard E 11-61) so as to remove fine particles; subsequently, 44.78 parts of the carrier material together with the catalyst solution are placed into a mixing vessel, which, for example, is composed of quartz, enameled steel or titanium. The drying operation is carried out in an oven which can be heated in any desired manner, for example, with hot air, electric resistors, open flames or steam. The heating process should preferably be carried out for approximately 8 hours or until everything is dry. A temperature as uniform as possible should preferably be maintained and one which is suitable for the impregnation, for example, a temperature ranging from about 80° to about 90° C. Initially, the heating is carried out at a higher temperature, however, when a satisfactory degree of dryness is attained, for example, after about 4 to about 5 hours, the heating is reduced. Once the liquid has partially evaporated, a scraper made of hard wood or of titanium, is used in the endeavor to prevent the catalyst from adhering to the sidewalls of the vessel. The drying process should not be carried out over too long a period of time, since at drying times exceeding 8 hours there exists the danger that the yields will be reduced. Once the catalyst is dry, it is removed from the mixing vessel and distributed into rectangular dishes, the dishes should have a height of a few centimeters, and consist of a suitable material, such as of quartz or titanium.

The mass is placed in these dishes and subsequently is activated in an oven which is heated to temperatures above 400° C, preferably from about 440° to about 450° C.

The oven can be of any type, but is preferably electrically heated and lined on the inside thereof with a fireproof or refractory material. The air stream, which permeates the catalyst, should not be too strong. It is for this reason, that it is preferable to utilize a hermetically sealed oven having a flue with a small diameter, for example, a lateral length of 12 × 18 mm. The foregoing ensures that the gaseous products of the calcination process can escape while at the same time moderate quantities of air can flow through the flue, thereby coming in contact with the catalyst, but without causing too great a draft. It is understood that when the oven walls and the closing members of the oven are effectively hermetically sealed, a flue with a larger diameter can be used. The calcination operation takes about 3 to about 7 hours, preferably from about 4 to about 5 hours. After the calcination process is completed the mixing vessel is removed from the oven and cooled to room temperature, after which the catalyst can be stored until the time of use.

The catalyst produced in accordance with the present invention is especially well suited for the preparation of maleic acid anhydride by the oxidation of benzene with oxygen, especially atmospheric oxygen. The catalyst displays great selectivity with respect to this use and also furnishes high yields of the end product in question.

The foregoing may be exemplified as follows:

The catalyst is placed into a catalyst-tube which, for example, has a cross-section of 21 × 25 mm. and an approximate length of 4 m; the tube is cooled by means of a fused salt bath (e.g., by means of a eutectic mixture consisting of calcium nitrate and sodium nitrate) having a circulation rate of approximately 0.8 – 1 m/sec. Into this tube, a benzene/air mixture having a ratio of 1.5 moles benzene per 100 moles of air, is introduced at a rate of about 2,000 to about 3,000 N l/hour. The oxidation temperature lies between about 350° and about 440° C, preferably between about 380° and about 420° C.

In order to isolate the maleic acid anhydride which has formed, the reaction gases are passed through water. The aqueous solution is then titrated, and the yield is calculated on the basis of the total quantity of benzene used.

Varying experiments may be carried out at different temperatures. Examples 1 and 2 (listed below) differ from one another in that different spatial velocities were used, and thus they differ with respect to the quantities of benzene passed through the system, whereas temperature, benzene/air-ratio and the above-described catalyst remain the same.

| salt-bath temperature (in °C) | spatial velocity | benzene /present in/ tube/hour (in g) | benzene /present in/ air (in mole%) | YIELD (in %) |
|---|---|---|---|---|
| EXAMPLE 1 | | | | |
| 360 | 2,000 | 90 | 1.23 | 88 |
| 365 | ″ | ″ | ″ | 91.4 |
| 370 | ″ | ″ | ″ | 94.3 |
| 375 | ″ | ″ | ″ | 96.1 |
| 380 | ″ | ″ | ″ | 94.9 |
| 390 | ″ | ″ | ″ | 92.5 |
| EXAMPLE 2 | | | | |
| 360 | 2,800 | 120 | 1.23 | 86 |
| 370 | ″ | ″ | ″ | 88 |
| 375 | ″ | ″ | ″ | 91.9 |
| 380 | ″ | ″ | ″ | 94.0 |
| 385 | ″ | ″ | ″ | 92.1 |
| 390 | ″ | ″ | ″ | 91.5 |

As can be seen, the higher the spatial velocity the lower the yield, but even in the case of extremely high spatial velocities (example 2) the yields are still quite high.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A process for the preparation of maleic anhydride comprising oxidizing benzene with an oxygen containing gas flow in the presence of a catalyst-complex expressed as a catalytic precursor consisting essentially of a mixture of the oxides and salts of molybdenum, vanadium, bismuth, phosphorous, sodium and silicon expressed as the oxides in the following amounts by weight: molybdenum as 1 part $MoO_3$, vanadium as 1.2 to 2.5 parts $V_2O_5$, bismuth as 0.2 to 1.1 parts $Bi_2O_3$, phosphorous as 0.02 to 0.05 parts $P_2O_5$, sodium as 0.03 to 0.06 parts $Na_2O$ and silicon as 0.03 to 0.3 parts finely ground $SiO_2$, on a support 2. A process for the preparation of maleic anhydride comprising oxidizing benzene with an oxygen containing gas flow in the presence of a catalyst-complex expressed as a catalytic precursor consisting essentially of a mixture of the oxides and salts of molybdenum, vanadium, bismuth, phosphorous, sodium and silicon expressed as the oxides in the following amounts by weight: molybdenum as 1 part $MoO_3$, vanadium as 1.2 to 2.5 parts $V_2O_5$, bismuth as 0.2 to 1.1 parts $Bi_2O_3$, phosphorous as 0.02 to 0.05 parts $P_2O_5$, sodium as 0.03 to 0.06 parts $Na_2O$ and silicon as 0.03 to 0.3 parts finely ground $SiO_2$, on a support, said support having a surface area of about 100 to 1,000 cm²/gm.

3. A process as defined in claim 2 wherein said support has a surface area of about 400 to 500 cm²/gm.

4. A process as defined in claim 2 wherein said support is comprised substantially of aluminum oxide.

5. A process as defined in claim 4 wherein said support also contains minor amounts of the oxides of alkali metals, alkaline earth metals and other metallic oxides.

6. A process as defined in claim 2 further comprising cooling said catalyst-complex by a fused salt bath having a circulation rate of about 0.8 to 1.0 m/sec during the oxidizing of said benzene.

7. A process as defined in claim 2 further comprising passing a benzene-air flow over said catalystcomplex at a rate of about 2,000 to 3,000 N 1/hour at a temperature of about 350° to 440° C.

8. A process as defined in claim 7 wherein the ratio of benzene to air in said air flow is approximately 1.5 moles: 100 moles, respectively.

9. A process as defined in claim 7 wherein said temperature is about 380° to 450° C.

* * * * *